United States Patent
Suzuki et al.

(10) Patent No.: US 7,113,267 B1
(45) Date of Patent: Sep. 26, 2006

(54) SYSTEM AND INSTRUMENT TO VERIFY ROUTING AND MEASURE INSERTION LOSSES OF MULTIPLE FIBER OPTIC ASSEMBLIES

(75) Inventors: Toshio Suzuki, Saitama (JP); Jose Salzberg, Naperville, IL (US)

(73) Assignees: Adamant Kogyo Co., Ltd., Tokyo (JP); Illum Technologies, Inc., Northbrook, IL (US)

( * ) Notice: Subject to any disclaimer, the term of this patent is extended or adjusted under 35 U.S.C. 154(b) by 0 days.

(21) Appl. No.: 11/081,386

(22) Filed: Mar. 16, 2005

(51) Int. Cl.
*G01N 21/00* (2006.01)

(52) U.S. Cl. .................................. 356/73.1

(58) Field of Classification Search .............. None
See application file for complete search history.

(56) References Cited

U.S. PATENT DOCUMENTS

| | | | |
|---|---|---|---|
| 5,838,843 A * | 11/1998 | Aose et al. | 385/12 |
| 6,459,478 B1 * | 10/2002 | Schmidt et al. | 356/73.1 |
| 6,970,237 B1 * | 11/2005 | Stolte | 356/73.1 |
| 2004/0033004 A1 * | 2/2004 | Welch et al. | 385/14 |

OTHER PUBLICATIONS

Article titled "Loss Measurement in Fiber-Optic Networks" by Pierre Talbot and Marie-Claude Michel.
Article titled "Insertion-Loss Measurement Accuracy for Fiber-Optic Components—An Analysis" by Christopher T. Allen, Ralph D. Taylor and James R. Stone.
Article titled "Meter, Backreflection, Multichannel" appearing on www.jdsu.com website.
General information and Specifications for the RX3 Series Multichannel Backreflection Meter appearing on www.jdsu.com.

* cited by examiner

*Primary Examiner*—Tu T. Nguyen
(74) *Attorney, Agent, or Firm*—Patzik, Frank & Samotny Ltd.

(57) ABSTRACT

An instrument and method is provided for verifying the routing of and measuring the insertion losses of multiple fiber optic assemblies. Each light source launches the same amount of light power into each fiber. Correcting factors are provided for the responsivity of each detector. Optical switches are avoided. Calibration of base optical powers is reduced and made independent of the cable assembly. Base optical power is equalized for all fibers. A responsive correction is also provided for all detectors. The number of times that the connectors are mated and unmated is also reduced.

4 Claims, 4 Drawing Sheets

SYSTEM AND INSTRUMENT TO VERIFY ROUTING AND MEASURE INSERTION LOSSES OF MULTIPLE FIBER OPTIC ASSEMBLIES

BACKGROUND OF THE INVENTION

1. Field of the Invention

The present invention relates to fiber optic assemblies and in particular, to a system and instrument for verifying the routing and measuring the insertion losses of multiple fiber optic assemblies.

2. Description of the Related Art

The availability and proliferation of multiple fiber optical connectors has increased the complexity of cable assemblies necessary for routing the signals generated by transmission equipment into multiplexers and other local equipment. Until recently, single optical fiber cables were used to direct the signals between relevant points. In many cases this involved hundreds of cable assemblies which occupied a fair amount of space and were difficult to organize.

To solve this problem, special cable arrangements like shuffles and flexible fiber circuits were introduced. Essentially, these arrangements consist of a collection of multiple fiber connectors, normally 8, 12 or more fiber MT or similar type fiber optic connectors, or a combination of multiple fiber and single fiber connectors, organized as input and output connectors. Fibers are then routed from one position in an input connector to another position in an output connector according to the specified routing requirements. By partially organizing the fibers in a ribbon fashion a very compact arrangement can be obtained.

FIG. 1 shows a shuffle type cable assembly. In particular, the input side connectors 101, the output side connectors 104 and the optical fibers 102 are shown. FIG. 2 shows a flexible circuit type cable assembly. The optical fibers 102 are glued on a flexible substrate 103. Shown also are the input side connectors 101 and the output side connectors 104.

Normally the specifications of these circuits involve a table showing the start and end of each fiber, from one of the many positions in a particular multiple fiber connector to one of the many positions in another particular multiple fiber connector. It is important to verify the correctness of the routing. Sometimes it is also necessary to determine the insertion loss (attenuation) introduced into the overall system by the cable assembly. This is important because of optical power budgeting considerations.

In any fiber optic interconnection, some loss occurs. Insertion loss for a connector or splice is the difference in power that is seen by the insertion of the device into the system. Insertion loss (or attenuation) is defined as the difference between the optical power launched into an interconnection cable and the optical power measured at the opposite end, or mathematically as follows:

Insertion Loss=10×log ($P1/P0$) dB

Wherein P0 is the power of the optical signal launched into a cable, and

P1 is the power of the optical signal as it passes out of the cable.

At present, there are two main methods to verify that routing is correct and to measure insertion losses. The first method consists of using a set of a limited number of light sources and detectors (usually 12 of each or less). Launching and receiving cables connected on one side to these light sources and detectors on the other side, respectively, are terminated with the required connector and then mated successively with the connectors in the shuffle or flexible circuit.

Only one multiple connector from the launching cable is mated with the connector in the shuffle or flexible circuit arrangement at one time. Since fibers in the arrangement could be routed arbitrarily from input to output connectors with fibers in one input connector being normally routed to one or more different output connectors, this implies that the mating of the cables has to be repeated several times for the same connectors, both in the input and output sides in order to verify the routing or measure the insertion losses. This not only increases the time and labor consuming nature of the measurement process, but the multiple operations of connecting and disconnecting might damage the fiber termination in the launching cables or the cable assembly arrangement itself. Moreover, determining the base power (P0 in the insertion loss formula) increases the complexity of the measurement.

The second method involves the use of optical switches. In this case, one light source is directed to each input fiber successively by mechanically or otherwise switching the light. Similarly, the light leaving each output fiber is switched to a single detector. The drawback of this last method is that optical switches for large numbers of positions are normally mechanically driven and consequently slow and bulky. Precision requirements also tend to make them expensive.

Accordingly, there is an unfilled need for a cost-effective system and instrument for quickly, easily and efficiently verifying the routing and measuring the insertion losses of multiple fiber optic assemblies. The present invention employs lasers and detectors that are currently manufactured in large quantities and relatively inexpensively so as to bypass the drawbacks of the two conventional methods mentioned above.

SUMMARY OF THE INVENTION

The present invention satisfies the aforementioned need by providing an instrument for verifying routing and measuring optical insertion losses in complex multiple connector, multiple fiber, cable assemblies, which limits the number of necessary mate-unmate operations of the connectors by using a number of light sources and connectors equal in quantity to the number of different fibers in the assembly. The instrument avoids the use of optical switches.

In particular, an instrument is provided for verifying routing and measuring optical insertion losses in multiple connector, multiple fiber, cable assemblies comprising multiple light sources for launching light having a level of optical power through each fiber assembly at a first end of the fiber assembly. Multiple light detectors are operably connected to and correspond to the light sources at the opposite end of the fiber assembly for reading the optical power of the light passing through the fiber assembly. The light sources are operatively associated with a current source so that each light source can be made to launch the same amount of optical power into each fiber assembly.

A processor is operably connected to the light sources and said light detectors for selectively activating a light source and its corresponding detector to determine the amount of optical power passing through the fiber assembly. The corresponding detector is further capable of indicating that no light has passed through the assembly and to that corresponding detector and thereby indicating a misrouted or broken fiber. The processor is further capable of selectively activating a light source and checking every detector for light erroneously launched to a detector other than the corresponding detector for that light source, so as to indicate a misrouted fiber.

The processor is further capable of providing that each detector has the same responsivity. The light sources and connectors are equal in number to the quantity of fibers in the assembly so as to reduce the number of times the assembly must be connected and disconnected from the instrument. The instrument also avoids the need to use optical switches.

In addition, a method is provided wherein the need to calibrate base optical powers for measuring insertion losses is reduced. Calibration is made independent of the cable assembly by introducing a mechanism to equalize base optical power for all fibers and provide a responsivity correction for all detectors.

In particular, the method of measuring optical insertion losses in multiple connector, multiple fiber cable assemblies comprises the step of successively attaching the launching cables of the instrument to a large area detector. The light sources that feed light to the cables are then activated one at a time. The current supplied to the light source is changed so that the reading of the detector is the same for every launching cable. This procedure is repeated for each launching cable.

Light is launched from any of the light sources into each of the detectors one at a time. The value of the current setting is retrievably stored in a table so that every time that light source is activated, the current is changed to this stored value and the light source launches the same amount of light power into a fiber being tested. The optical power reading is retrievably stored and used to determine a correcting factor for the responsivity of each detector; thereby making such instrument calibration, independent of the cable assembly being tested, by equalizing base optical power for all fibers, providing a responsivity correction for all fibers and avoiding the need to repeatedly calibrate the base optical powers of the instrument.

These and other objects, advantages, and features of the present invention will be more fully understood and appreciated by reference to the written specification and appended drawings.

DETAILED DESCRIPTION OF THE DRAWINGS

Figure 1:
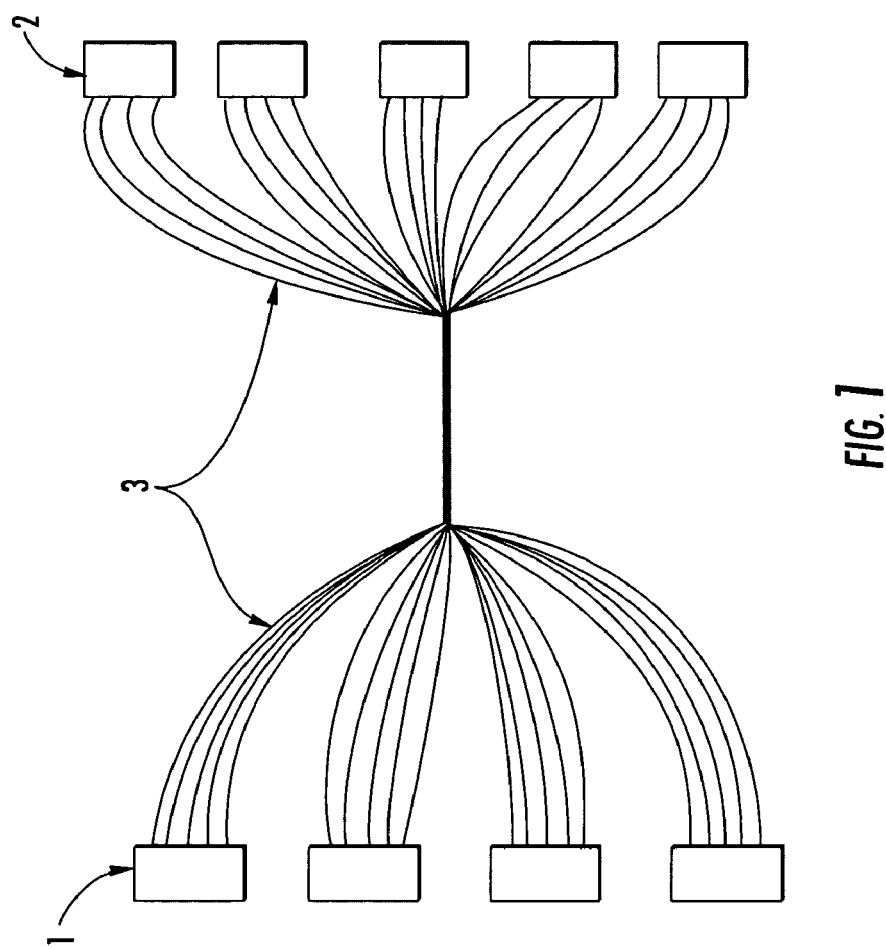
FIG. 1 is a block diagram of a shuffle type multiple fiber optic cable assembly.
Figure 2:
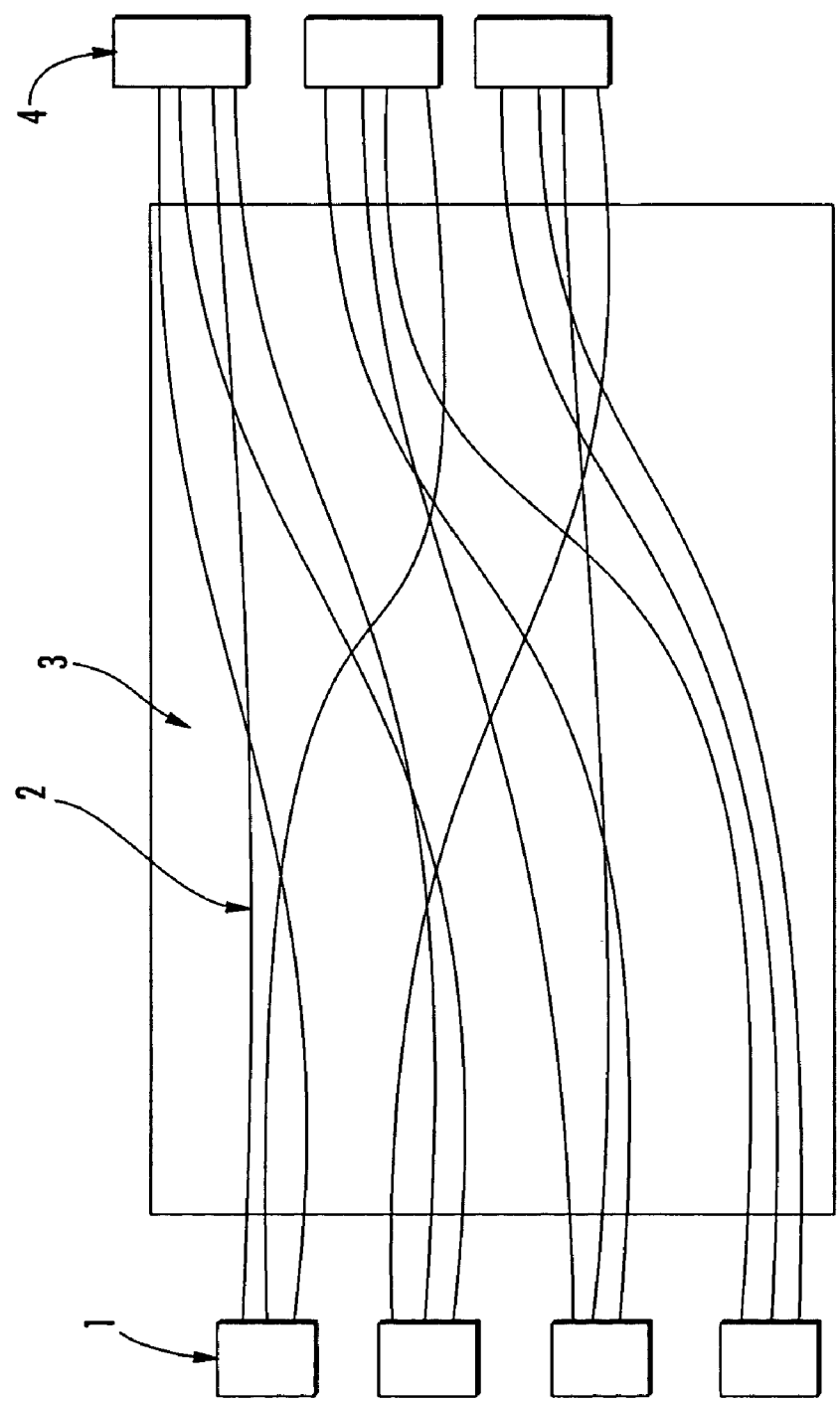
FIG. 2 is a block diagram of a flex-circuit type, fiber optic cable assembly.

By way of disclosing a preferred embodiment, and not by way of limitation, there is shown in FIG. 1, a typical shuffle type cable assembly. In particular, the input side connectors 101, the output side connectors 102 and the optical fibers 103 are shown. FIG. 2 shows a flexible circuit type cable assembly. The optical fibers 102 are typically glued on a flexible substrate 103. Shown also are the input side connectors 101 and the output side connectors 104.

Figure 3:
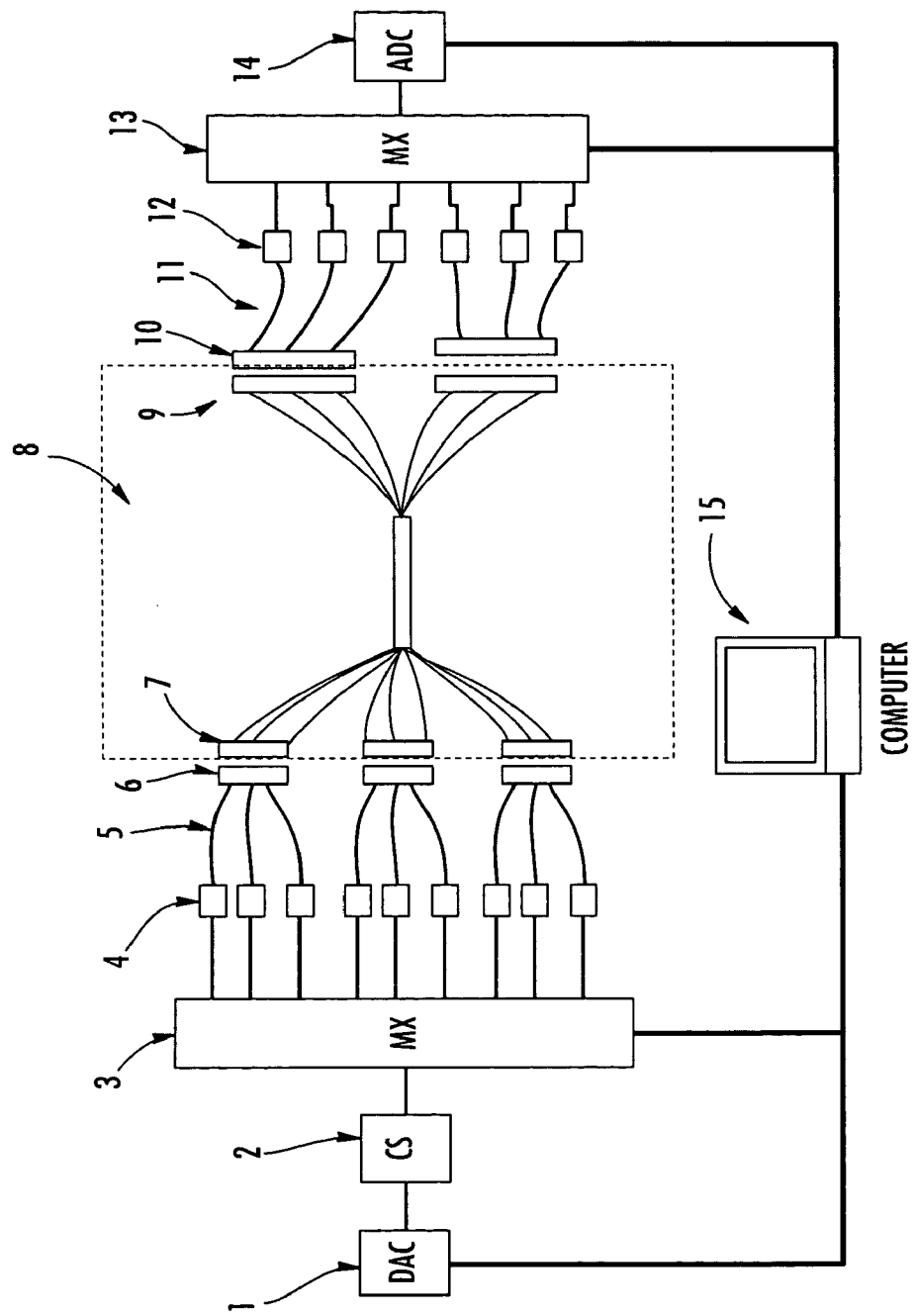
FIG. 3 is a block diagram of the measurement arrangement of the present invention, with the cable assembly shown within the dashed box.

To facilitate the measurement of insertion losses in such multiple cable fiber optic cable assemblies of FIGS. 1 and 2, an instrument, shown in block diagram in FIG. 3 was devised. In FIG. 3 the cable assembly under test is shown contained within the dashed box 8. Assembly input side connectors 7 of the cable assembly are capable of connecting with multiple fiber connectors 6, while assembly output side connectors 9 are capable of connecting with multi-fiber connectors 10.

The test instrument includes an arrangement of multiple light sources 4 attached to fibers 5 terminated in multiple fiber connectors 6 that are mated with the assembly input connectors 7. The number of input 7 and output connectors 8 do not have to be equal since some of the fiber positions in the various connectors might be unoccupied, The connectors used can typically carry twelve fibers and a typical assembly might have up to 24 connectors in each side, so that 288 light sources and 288 detectors are necessary. The instrument can be adapted to handle larger numbers. Common light sources include light emitting diodes (LEDs) for multimode applications and solid state lasers of various types for single mode applications. Detectors are generally PIN photodiodes (Si, Ge, AlGaAs and other types) selected to match the wavelength of the light sources. There are normally as many connectors 6 as there are assembly connectors 7 in the fiber assembly, though virtually any number of such pairs of connectors can be used.

The light sources 4 are attached to a multi-channel multiplexer 3 in a scheme that permits only one of the light sources 4 to be turned on at one time. Such multiplexers are electronic devices that route the driving current to the intended light source. A voltage controlled current source 2 permits control of the current to each light source 4, so that each one can be made to launch the same optical power into each attached launching fiber of connectors 6. To this purpose the computer 15 saves in memory the digital number that has to be presented to the digital to analog converter (DAC) 1. The driving currents for each light source are determined during the instrument setup and this arrangement facilitates the measurement of the base optical power, as will be explained in detail hereinbelow.

On the detector side, the equipment also includes a number of detectors 12 equal or larger than the total number of output fibers. Cable assemblies 11 terminated with multi-fiber connectors 10 carry the light from the output fibers of the assembly 8 under test to the detectors 12. The detectors, when illuminated by light produce a current which is sent to an analog-to-digital converter 14 by means of a multiplexing scheme 13 that permits only one detector output to be read at a given time. The output current of the multiplexer 13 is transformed into a voltage, amplified and read by the analog to digital converter (ADC) 14.

With this measurement arrangement every connector 7 in the input side of the arrangement 8 is mated only once with only one launching connector 6. A similar consideration applies to the output side of the arrangement 8 where the receiving connector 10 is mated only once with each connector 9 of the output side of the cable assembly.

The routing verification function is performed in the following manner. Each fiber assembly is associated with a table that lists all the connections between input and output fibers. Each row of the table specifies one connection, from one particular fiber in one particular input connector 7 to one particular fiber in one particular output connector 9. The routing verification task ensures that the assembly was built correctly with no misrouted fibers and that there are no broken fibers.

First the cable assembly 8 is hooked to the instrument, i.e. all connectors 6 and 7 are mated on the input side and 9 and 10 on the output side. A computer program is then started. The computer 15 can be a microcontroller integrated as a part of the instrument, or an external computer, or a combination of both, in which the external computer is used to enter the routing table by the user and then sends the routing data to the microcontroller which manages the multiplexing and other functions, reads the detector values and then communicates the results back to the external computer which interacts with the user. If an external computer is used, it should have the means to communicate with the equipment via adequate means (serial, USB, parallel port or other). The computer program should allow the user to enter or select, if already in memory, the appropriate connection table. It then reads the first item of the table and sets multiplexer 3 so that the corresponding light source is turned on, and sets multiplexer 13 so that the corresponding detector 12 can be read by the ADC 14.

Whenever the corresponding detector 12 shows no light, then either there was a misrouting or that fiber being tested is broken. Keeping the launching light source on, all detectors can be scanned to see if the light was launched into another (wrong) fiber. If none of the detectors show any light, the most probable cause for the lack of detected light, is a broken fiber or a badly polished or otherwise badly terminated connector.

Figure 4:
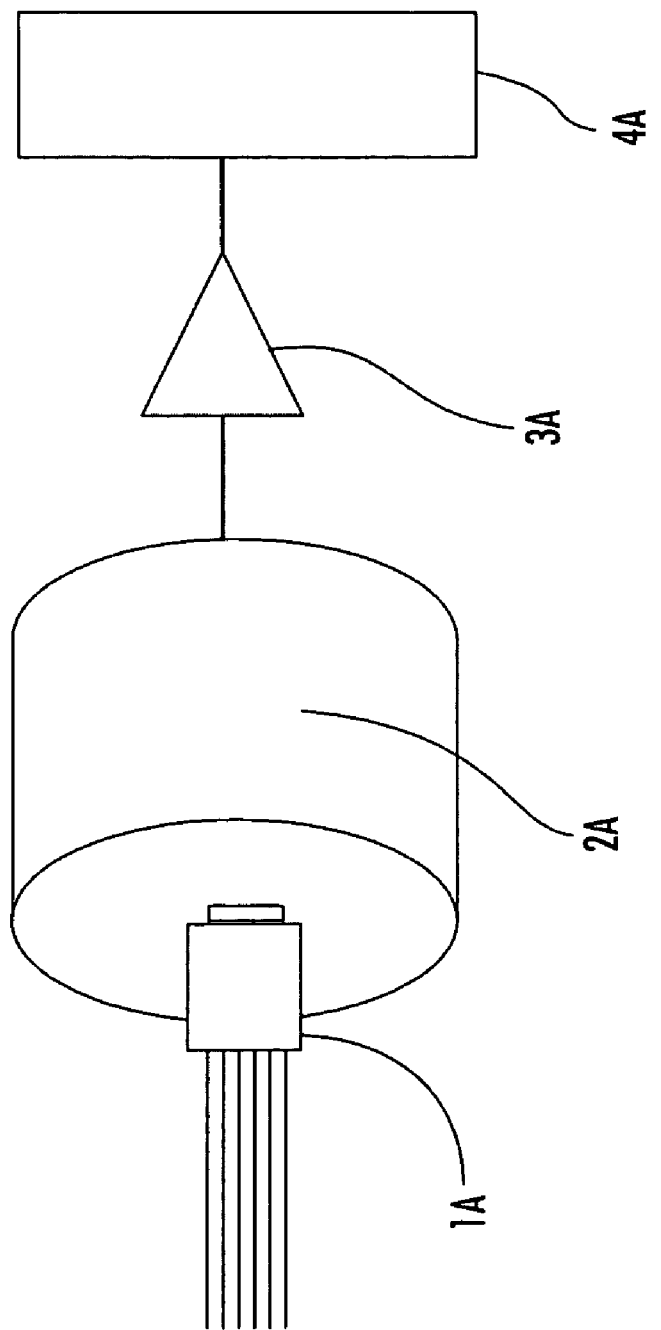
FIG. 4 is a schematic of the large area detector arrangement.

A previous setup should be performed to the instrument before it can be used to measure insertion losses. The setup procedure has two functions: First it will ensure that all light sources 4 in FIG. 3 launch the same amount of light power into each fiber 5. Second, it will measure the response efficiency (responsivity) of each detector and create a table of correction factors to equalize them. This setup should be repeated periodically, and is performed in the following way: First, each of the launching connectors 6 in FIG. 3 are successively placed in the large area detector 2A shown in FIG. 4. This detector has an active area large enough so that it can absorb all the light emitted by any of the multiple fibers in connector 1A. Each of the light sources feeding each fiber in connector 1A is turned on and its driving current increased while the output power is measured using the amplifier 3A and analog-to-digital converter 4A. When the light power gets to a predetermined level, the value of the driving current of the light source is stored in a table to ensure that every time it is turned on in the future the just found driving current is used to ensure a fixed light power output. The procedure is repeated for all launching connectors 6 in FIG. 3.

Once all light sources are equalized, the second step of the setup procedure is performed. The aim is to determine the responsivity of each of the detectors. To that effect, any one of the launching connectors 6 is selected, and it is attached to the first receiving connector 10. Once this is done, each one of the detectors launching light into each of the fibers 5 are turned on successively, while measuring the corresponding output of the detectors 12 and storing the results in a table. The procedure is repeated attaching the same launching connector 6 to all the other receiving connectors. In this way, a correction factor can be determined for the responsivity of each one of the detectors 12 so that all detectors will respond in the same way. The corrected power will be P0 in the formula for the insertion loss shown above.

The setup procedure is somewhat time consuming but it needs to be performed only periodically and in particular when launching or receiving cables are changed. Note that this setup procedure is general and not related to the particular routing requirements of the assemblies to be tested. Once the setup is completed insertion losses can be measured. To do this, the assembly under test is connected to the instrument in the same way specified before for the routing verification. Each of the laser sources are turned on one at a time and the power measured by the corresponding connector according to the connection table P1 is determined. The insertion loss for each fiber connection is determined using the formula above.

Many modifications and variations of the present invention are possible in light of the above teachings. It is therefore to be understood that within the scope of the appended claims, the invention may be practiced otherwise than as specifically described.

What is claimed is:

1. An instrument for verifying routing and measuring optical insertion losses in multiple connectors, multiple fiber cable assemblies comprising:

multiple light sources for launching light having a level of optical power through each fiber assembly at a first end of the fiber assembly;

multiple light detectors operably connected to and corresponding to the light sources at the opposite end of the fiber assembly for reading the optical power of the light passing through the fiber assembly;

the light sources being operatively associated with a power source so that each light source can be made to launch the same amount of optical power into each fiber assembly;

a processor operatively connected to said light sources and said light detectors for selectively activating a light source and its corresponding detector to determine the amount of optical power passing through the fiber assembly;

said corresponding detector further being capable of indicating that no light has passed through the assembly and to that corresponding detector and thereby indicating a misrouted or broken fiber; and, said processor further being capable of selectively activating a light source and checking every detector for light erroneously launched to a detector other than the corresponding detector for that light source, so as to indicate a misrouted fiber.

2. The invention according to claim 1 wherein said invention further comprises said processor further being capable of providing that each detector has the same responsivity.

3. The invention according to claim 1 wherein said light sources and connectors are equal in number to the quantity of fibers in the assembly so as to reduce the number of times the assembly must be connected and disconnected from the instrument.

4. The invention according to claim 1 wherein the instrument avoids the need to use optical switches.

* * * * *